(12) United States Patent
Laimböck

(10) Patent No.: US 7,305,961 B2
(45) Date of Patent: Dec. 11, 2007

(54) MODULE-LIKE CONSTRUCTED INTERNAL COMBUSTION ENGINE

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 390 days.

(21) Appl. No.: 10/518,339

(22) PCT Filed: Jun. 18, 2003

(86) PCT No.: PCT/AT03/00172

§ 371 (c)(1),
(2), (4) Date: Dec. 17, 2004

(87) PCT Pub. No.: WO04/001194

PCT Pub. Date: Dec. 31, 2003

(65) Prior Publication Data

US 2006/0130802 A1 Jun. 22, 2006

(30) Foreign Application Priority Data

Jun. 19, 2002 (AT) .............................. GM396/2002

(51) Int. Cl.
*F02B 75/22* (2006.01)
(52) U.S. Cl. ............................... 123/195 R; 123/198 R
(58) Field of Classification Search ............ 123/195 R, 123/198 R
See application file for complete search history.

(56) References Cited

U.S. PATENT DOCUMENTS 3,837,237 A 9/1974 Rössler et al.
4,618,021 A * 10/1986 Ashikawa et al. .......... 180/248
2002/0042319 A1 4/2002 Otten et al.

FOREIGN PATENT DOCUMENTS

| AT | 003397 | 2/2000 |
| DE | 2253100 | 5/1974 |
| DE | 244793 | 4/1987 |
| DE | 290556 | 6/1991 |
| DE | 4206086 | 9/1993 |

\* cited by examiner

*Primary Examiner*—Noah P. Kamen
(74) *Attorney, Agent, or Firm*—Dykema Gossett PLLC

(57) ABSTRACT

The invention relates to a modular internal combustion engine (1) comprising an engine housing (17, 117) with a crankshaft drive (40) having at least one reciprocating piston (4) in a cylinder (2), which acts on a crankshaft (6) by means of a connecting rod (5), and a variable-speed gear box (10) connected to the crankshaft (6) via a disengaging clutch (8), and a gearbox output train (12) which connects to at least one drive shaft (15) of a vehicle. In order to serve a large variety of vehicle types with a single low-cost engine design the proposal is put forward that the internal combustion engine (1) should have at least one main module (26) including the subassemblies engine housing (17), crankshaft drive (40), variable-speed gearbox (10), and gearbox output train (12), and at least one auxiliary module (27, 28, 29, 30, 31, 32) attachable to the main module (26), and that no mechanical connection be provided between the variable-speed gearbox (10) and the gearbox output train (12) within the main module (26) but that a rotational connection be effected by attaching a first auxiliary module (27) to the main module (26).

27 Claims, 6 Drawing Sheets

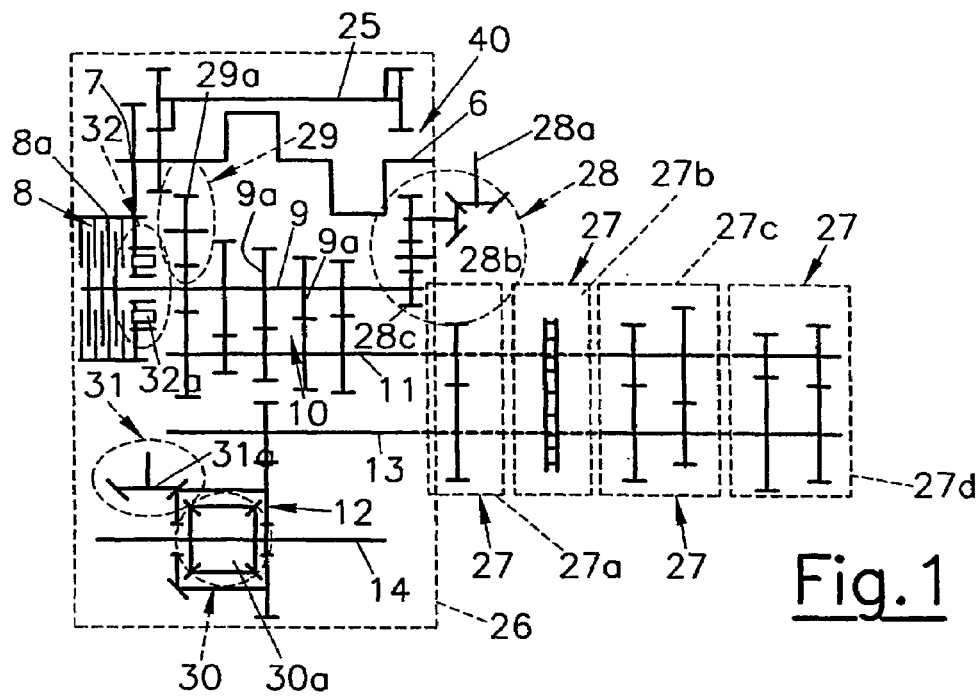
Fig.1
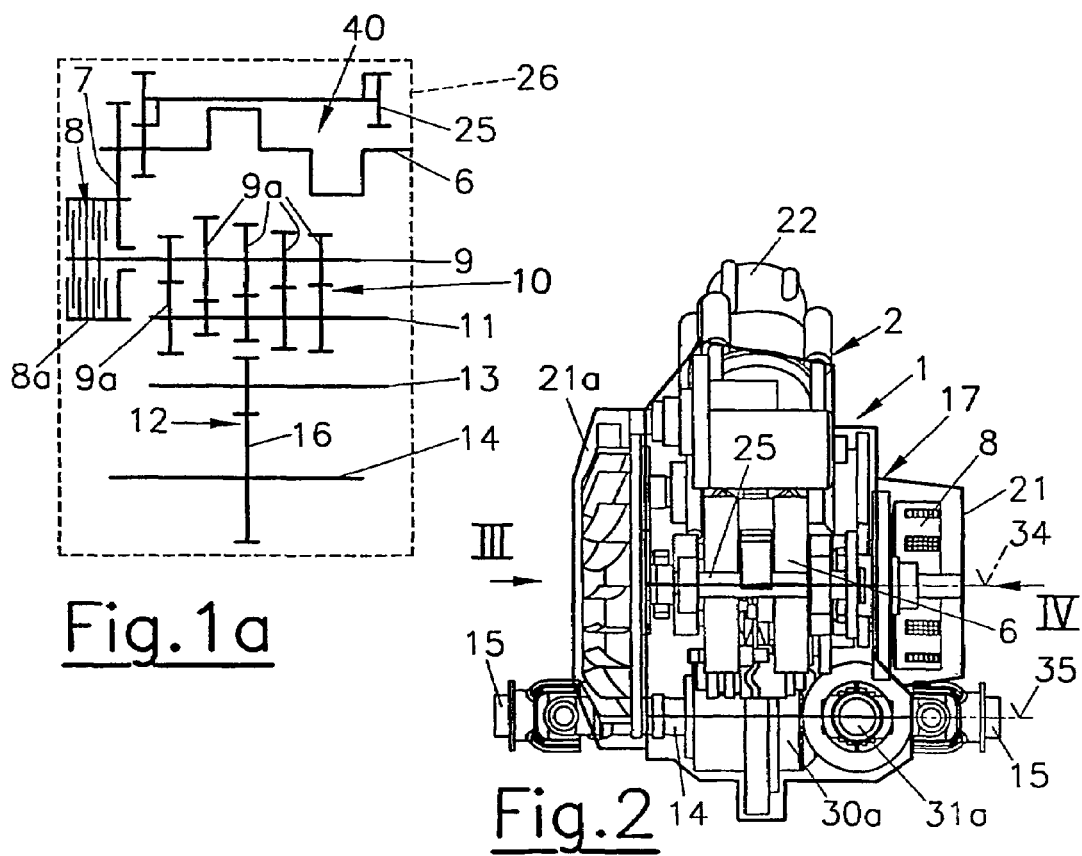
Fig.1a
Fig.2

MODULE-LIKE CONSTRUCTED INTERNAL COMBUSTION ENGINE

BACKGROUND OF THE INVENTION

1. Field of the Invention

The invention relates to a modular internal combustion engine comprising an engine housing with a crankshaft drive having at least one reciprocating piston in a cylinder, which acts on a crankshaft by means of a connecting rod, and a variable-speed gear box connected to the crankshaft via a disengaging clutch, and a gearbox output train which connects to at least one drive shaft of a vehicle.

2. The Prior Art

From AT 3.397 U1 an internal combustion engine for a motor cycle is known, in which the subassemblies for the engine are configured as modular units and are universally useable for at least two different cylinder configurations. This will permit realization of various performance classes and cylinder configurations at low cost and without complicated logistics. By its design this internal combustion engine is suitable only for motorcycles and not for other types of vehicles.

It is the object of the present invention to propose a multi-purpose internal combustion engine which may serve for a large number of design variants and has low production cost.

SUMMARY OF THE INVENTION

According to the Invention this object is achieved by providing that the internal combustion engine should have at least one main module including the subassemblies engine housing, crankshaft drive, variable-speed gearbox, and gearbox output train, and at least one auxiliary module attachable to the main module, and that no mechanical connection between the variable-speed gearbox and the gearbox output train be provided within the main module but that a rotational connection be effected by attaching a first auxiliary module to the main module.

It is further provided that the main module additionally comprise at least one of the parts crankshaft, mass balancer shaft, piston, connecting rod or switchable clutch. The engine housing is configured either for one or for two cylinders.

In order to achieve as high a number of application variants as possible, it is of particular advantage if the first auxiliary module contains at least one gear step from the following group: simple gear, reverse gear, reduction gear, crawler reduction gear, the axis distance of this gear step preferably corresponding to the axis distance between an output shaft of the variable-speed gearbox and a secondary input shaft of the gearbox output train.

It is the essential idea of the invention to cover as large a number of different vehicle requirements as possible by combining a main module for single-cylinder engines or a main module for two-cylinder engines with diverse auxiliary modules.

Due to the modular concept one- and two-cylinder engines of the diesel type or the spark-ignited type can be realised with a large number of shared parts and only two different types of engine housing. For simple production it is of particular advantage if all surfaces to be machined and all bores of the engine housing with n cylinders have the same position as a subset of all surfaces and bores of a similar engine housing with a higher number m>n of cylinders and that the engine housing with n cylinders is machined on a working station whose tools are configured and adjusted for the machining of the engine housing with the higher number m of cylinders. The variables n and m for a concrete variant will for instance have the values 1 and 2. Machining is done with the same tools in both cases, with the tools for working the second cylinder being idle when an engine block for a single cylinder is being machined.

By inserting or attaching auxiliary modules, such as diverse secondary reduction gears, differential gear, centrifugal clutch (semi-automatic), power take-off shaft, four-wheel-drive, in or on one of the two engine housings, each engine variant (diesel, spark-ignited, one- or two cylinder) may be adapted for a specific type of vehicle.

Each of the first auxiliary modules contains a different secondary reduction gear step. Simple reduction gears having a pair of toothed wheels or a chain permit the engine to be placed in the vehicle either in front of or behind the driven axle, the gearbox and the crank assembly being placed either in front of or behind the engine. A second auxiliary module with a simple gear of a pair of toothed wheels will for instance permit the positioning of the engine in front of the driven axle, a second auxiliary module configured as a reverse gear with a chain will permit the positioning of the engine behind the driven axle.

The optional use of first auxiliary modules with a reduction gear or a crawler reduction gear permits the application of the internal combustion engine in ATV-vehicles (all terrain vehicles) or small tractors, In such ATV applications the first auxiliary module may be provided with a reduction gear. In an application for small tractors it could make sense to use a first auxiliary module with an included crawler reduction gear.

When the internal combustion engine is to be used for small tractors, it is of particular advantage if a second auxiliary module with an output gear for a PTO-shaft can be attached to a gear shaft of the variable-speed gearbox. The PTO-shaft is driven via the first gear shaft of the variable-speed gearbox, the PTO-gear step being advantageously driven by a toothed wheel of the first gear shaft.

In a further embodiment of the invention it may be provided that a third auxiliary module with a shiftable reverse gear for the variable-speed gearbox can be attached to the main module. Shifting of the, say five, forward gears and the reverse gear may be effected by means of a shifting drum.

In the simplest variant of the invention, e.g. for a motor-rickshaw, the internal combustion engine may be configured without differential. In further development a fourth auxiliary module with a differential gear for the gearbox output train could be attached to the main module.

To realise a four-wheel-drive, e.g. for ATVs or small tractors, a fifth auxiliary module with an output driving gear for the gearbox output train may be attached to the main module or to the fourth auxiliary module.

In a particularly advantageous variant of the invention it is provided that a sixth auxiliary module with a centrifugal clutch be attached to the main module at the input side of the variable-speed gearbox. This will permit realising an automatic clutch for automatic changing of gears (semi-automatic) or for automatic drive-off and will enable the changing of gears without clutch. When the gearshift lever is actuated the superimposed function of the centrifugal clutch will disengage the engine from the gear train as required for the shifting of gears. In order to permit engine-braking the centrifugal clutch is provided with a freewheel mechanism.

To minimize the number of parts it is provided in a further variant of the invention that the first auxiliary module should have the same housing for all gear variants.

In order to simplify the manufacture and assembly of parts a further variant of the invention provides that at least five shafts, and preferably at least crank shaft, balancer shaft, first gearbox shaft, second gearbox shaft and first secondary shaft be positioned in one and the same plane, which plane preferentially is a first partitioning plane between two parts of the housing. The shafts are placed in the first or second housing part, such that their axes lie in the partitioning plane. The other part of the housing is then simply put in its place on the first part. This method of assembly has the advantage that it is not necessary to introduce the shafts into the holding bores of housing parts.

The modular design of the internal combustion engine permits its use for a great diversity of applications. The invention provides for the main module to be suitable for at least two types of vehicles from the group of motor-rickshaws, ATVs, small tractors and micro-cars.

With reference to the enclosed drawings the invention will now be explained in more detail.

BRIEF DESCRIPTION OF THE DRAWINGS

FIG. 1 a schematic view of the modules of an internal combustion engine according to the invention, FIG. 1a the main module of this internal combustion engine in a schematic view, FIG. 2 the internal combustion engine according to the invention in a side view indicated by arrow II in FIGS. 3 and 4, FIG. 3 the internal combustion engine in a view indicated by arrow III in FIG. 2, FIG. 4 the internal combustion engine In a view indicated by arrow IV in FIG. 2, FIG. 5 the internal combustion engine in a section along line V-V in FIG. 4, FIG. 6 a second variant of the internal combustion engine in a side view indicated by arrow VI in FIGS. 7 and 8, FIG. 7 this internal combustion engine in a view indicated by arrow VII in FIG. 6, FIG. 8 this internal combustion engine In a view indicated by an arrow VIII in FIG. 6, and FIG. 9 this internal combustion engine in a section along line IX-IX in FIG. 8.

DETAILED DESCRIPTION OF THE PREFERRED EMBODIMENTS

Figure 3:
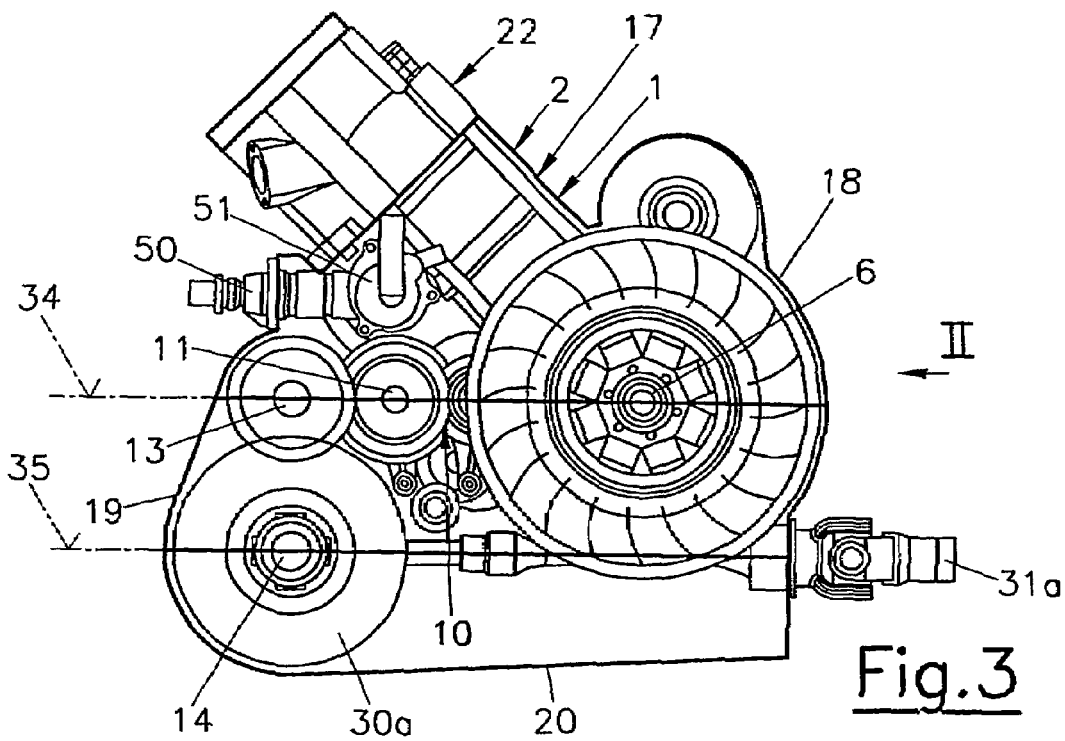

Functionally equivalent parts bear the same reference numbers in the individual variants.

The internal combustion engine 1 with liquid coolant has a crankshaft drive 40 including one or more cylinders 2 with a reciprocating piston 4 in a cylinder sleeve 3. The piston 4 acts on a crankshaft 6 via a connecting rod 5, thus turning the crankshaft. The assembled crankshaft 6 is connected to a first gearbox shaft 9 of a variable-speed gearbox 10 by means of a pair of toothed wheels 7 and a disengaging clutch 8, the variable-speed gearbox having five gears in the examples. In the example the clutch 8 is configured as a combined manual and semiautomatic clutch. The first gearbox shaft 9 acts on a second gearbox shaft 11 by means of manually shiftable gears 9a. A part 8a of the clutch 8, which is permanently connected to the crankshaft 6, acts as controlling drive for the gas exchange valves 23, 24 and for an injection pump 50, 50a. Other auxiliary units such as the water pump 51, speed controller 52, etc. may also be driven by part 8a.

The gearbox output train 12 comprises a first secondary shaft 13 and a second secondary shaft 14, acting on at least one drive shaft 15. The first and second secondary shafts 13, 14 are coupled by means of a gear 16.

Piston 4, crankshaft 6, variable-speed gearbox 10 and gearbox output train 12 are located in an engine housing 17, 117, which consists of housing parts 18, 19, 20 and 118, 119, 120, respectively. The engine housing 17, 117 is laterally closed by a housing cover 21, 21a. Reference number 22 designates a cylinder head containing the gas exchange valves 23, 24. The engine housing 17, 117 furthermore contains a balancer shaft 25 driven by the crankshaft 6.

Figure 4:
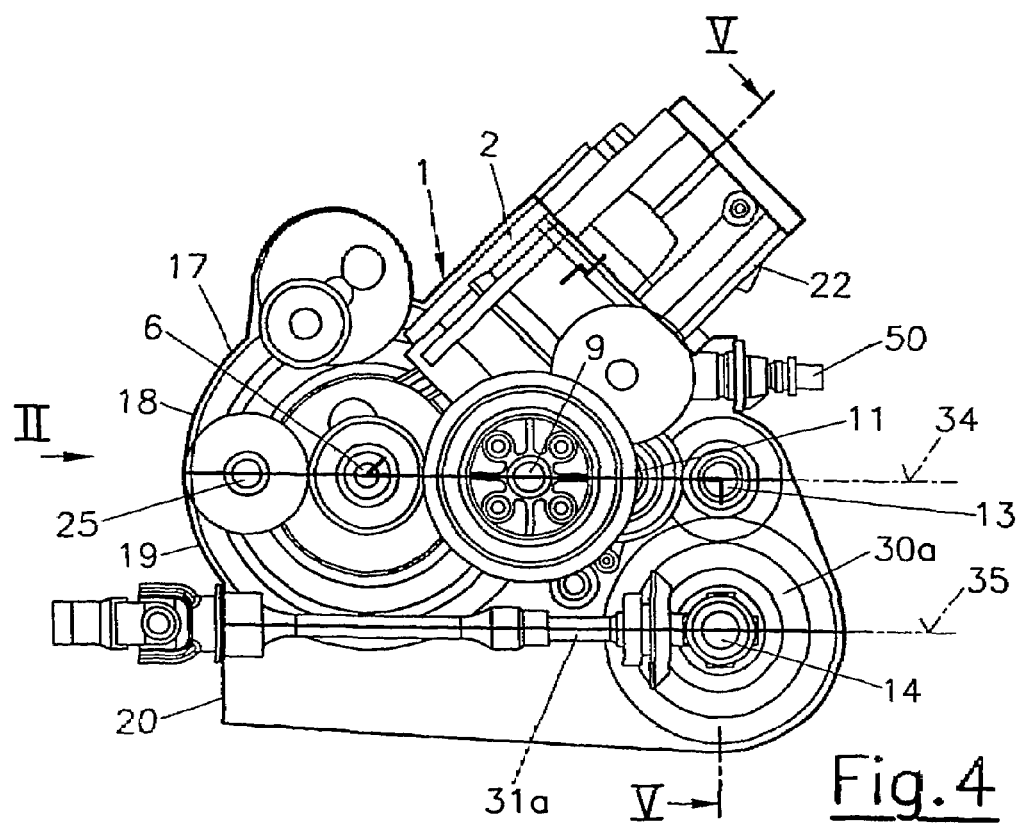
Figure 5:
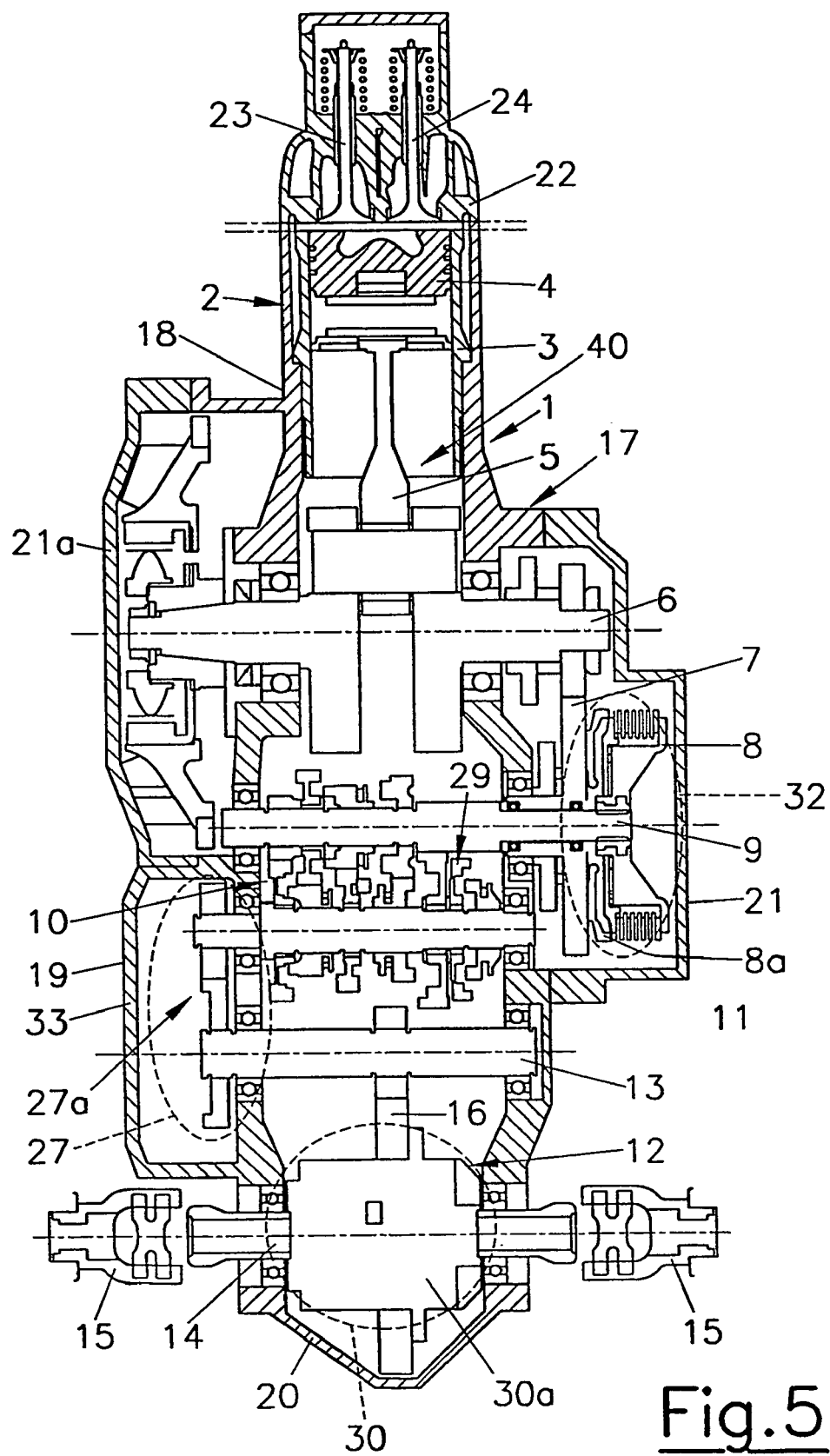
Figure 6:
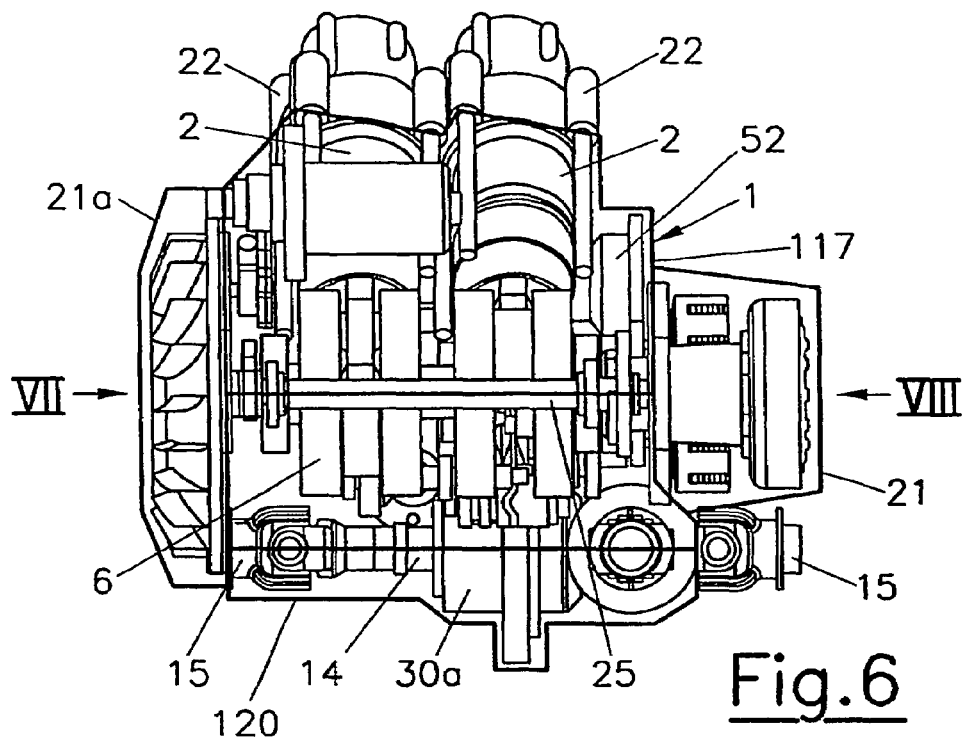
Figure 7:
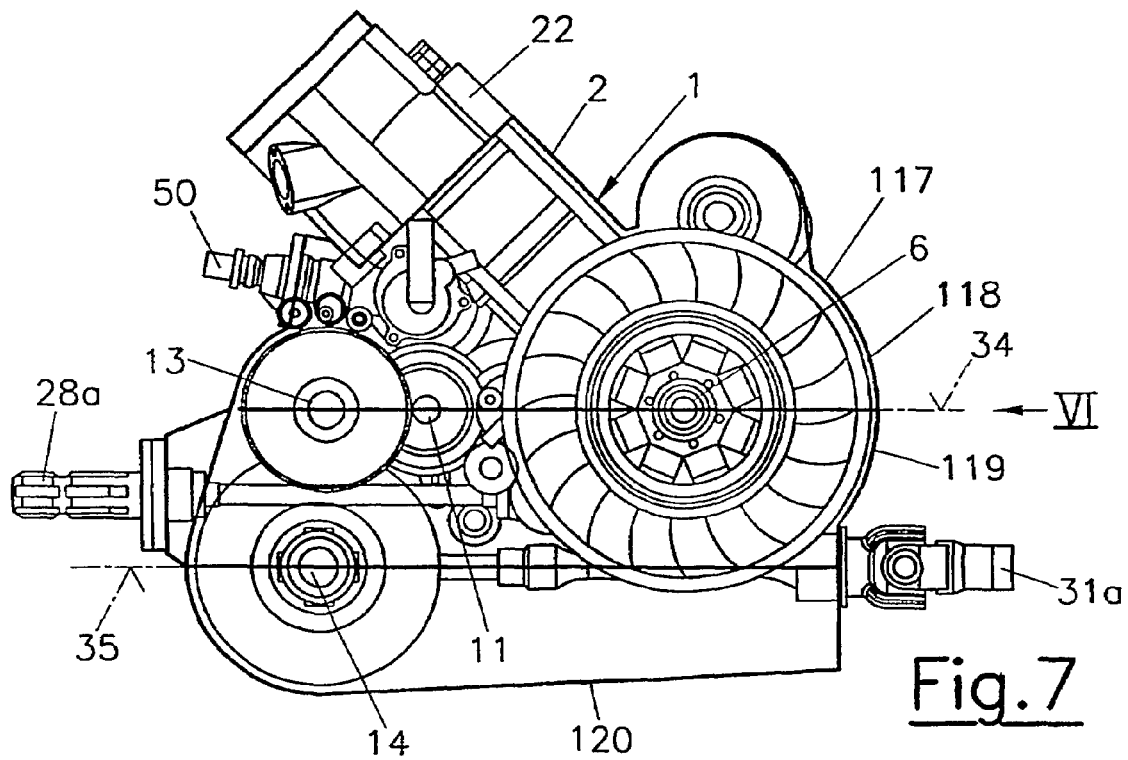
Figure 8:
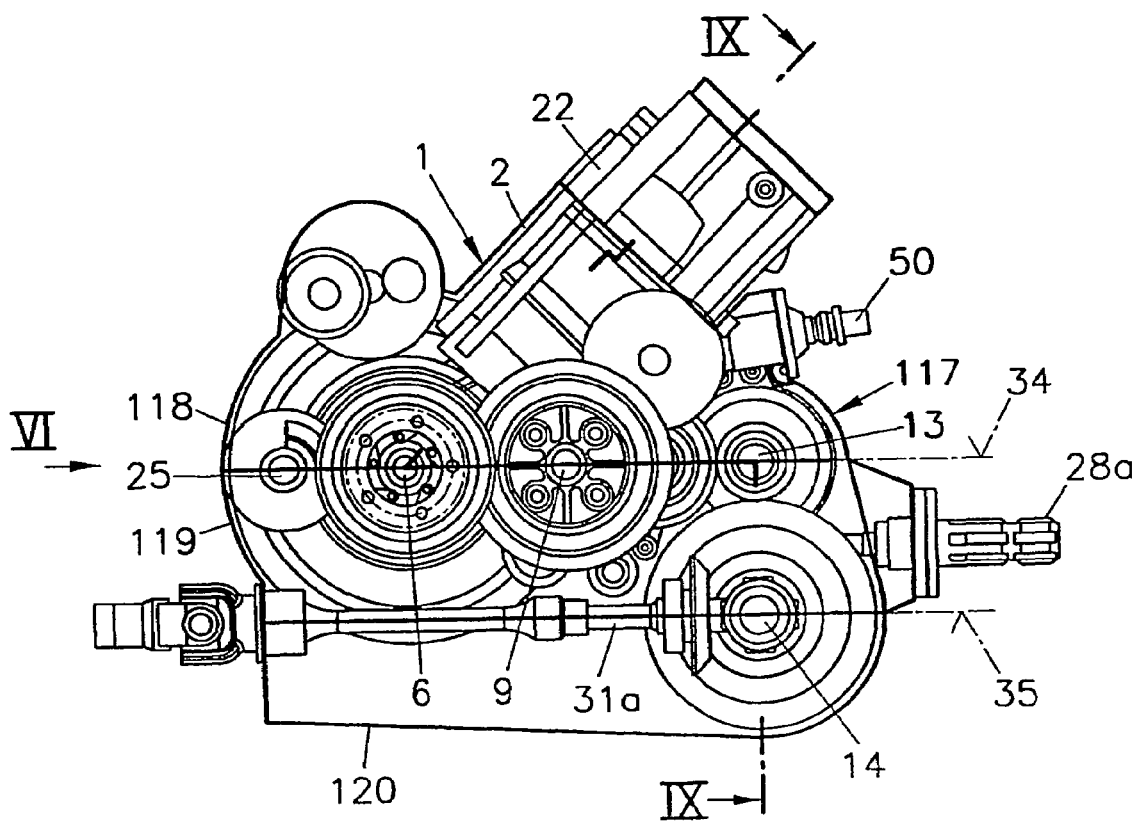
Figure 9:
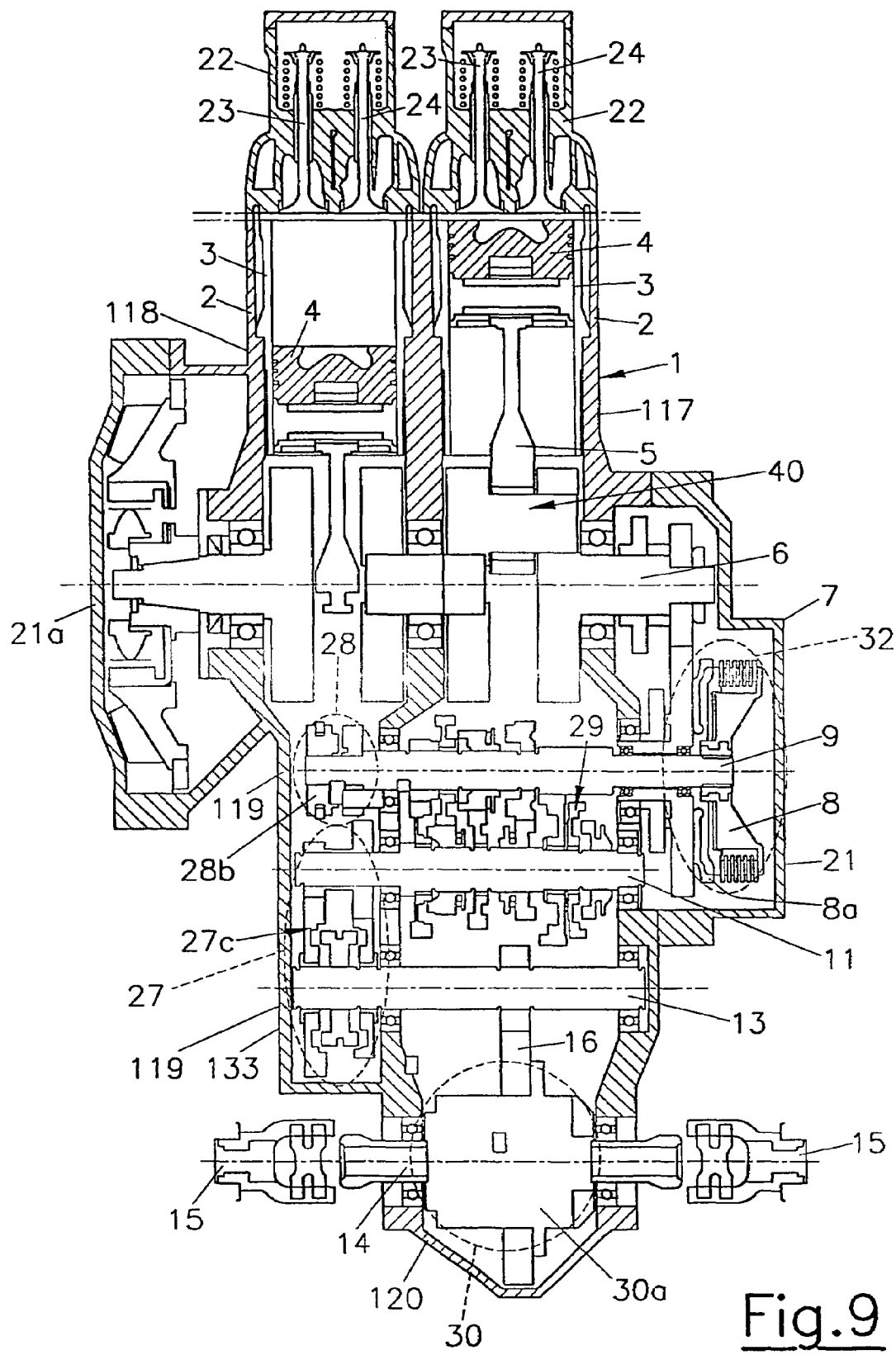

The engine housing 17, 117 with piston 4, connecting rod 5, crankshaft 6, gearbox 10, clutch 8, gearbox output train 12 and balancer shaft 25 make up the main module 26, which is produced and may be used for a variety of vehicle types. The first variant shown in FIGS. 2 to 5 has one cylinder 2, while the second variant shown in FIGS. 6 to 9 has two cylinders 2, the engine housings 17, 117 differing accordingly, With the exception of the engine housing 17, 117 the other parts are essentially identical.

Within the main module 26 the gearbox 10 and the gearbox output train 12 are not mechanically connected. According to the given requirements the main module 26 may be furnished with a first auxiliary module 27, a second auxiliary module 28, a third auxiliary module 29, a fourth auxiliary module 30, a fifth auxiliary module 31 and/or a sixth auxiliary module 32. The first auxiliary module 27 consists of a gear step connecting the second gearbox shaft 11 and the first secondary shaft 13, which gear step may be configured as a simple gear 27a, or a reverse gear 27b, or a reduction gear 27c, or a crawler gear 27d. The gear step of the first auxiliary module 27 is covered by a housing wall 33, 133, which may be formed as an integral part of the housing part 18, 19 resp. 118, 119, The main module 26 and auxiliary modules 27, 28, 29, 30, 31 and 32 are indicated by dashed lines in FIGS. 1 and 1a.

For small tractors a second auxiliary module 28 is attached to the main module 26. The second auxiliary module 28 contains a power-take-off (PTO) shaft which is connected to the first gearbox shaft 9 by means of an output gear 28b. The PTO-shaft 28a is driven by the toothed wheel 28c of the gear 28b on the first gearbox shaft 9.

In the first variant of the invention the internal combustion engine is configured without reverse gear, i.e. without shiftable reverse gear 29a. The shiftable reverse gear 29a may be attached to the main module 26 as third auxiliary module 29, the shifting of the five forward gears and the reverse gear being effected by means of a shifting drum not further shown in the drawing. The reduction gears of the reduction gear step 27c and the crawler reduction gear step 27d of the first auxiliary module 27 are actuated by another shifting drum.

In the simplest variant the gearbox output train is not provided with a differential. This variant is for instance suitable for motor-rickshaws. The differential gear 30a is attached to the main module 26 as a fourth auxiliary module 30 in the area of the second secondary shaft 14 of the gearbox output train 12. For vehicles with four-wheel-drive, e.g. so called ATVs (all terrain vehicles) or small tractors (SMCT—small capacity tractors) a fifth auxiliary module 31 with an output gear step 31a is provided at the main module 26. The four-wheel-drive may be realised via one of the output shafts of the differential gear 30a of the fourth auxiliary module 30 (which may be situated at the front or rear axle as required) or via a central differential gear if the engine is positioned longitudinally. In the latter case the four-wheel-drive variant may have three differentials, the differential 30a of auxiliary module 30 being configured as central differential and additional axle differentials being provided at the front and rear axle. Alternatively to the axle differentials at driven axles a rigid drive or a slipping clutch may be provided.

To implement a semi-automatic five-gear transmission or to enable automatic drive-off and gear-shifting without clutch a sixth auxiliary module 32 with a centrifugal clutch 32a for power transmission may be provided at the input of the first gearbox shaft 9. Moving the gear lever as a superimposed function of the centrifugal clutch 32a will cause the disengagement of crankshaft 6 and gearbox 10, which is required for gear change. The centrifugal clutch 32a includes a free-wheel device to permit engine braking.

The position of the shafts (crankshaft 6, first gearbox shaft 9, second gearbox shaft 11, first secondary shaft 13, second secondary shaft 14, balancer shaft 25) is the same in all variants of the engine. Thus machining and drilling plans will be the same, and the engine housing 17, 117 for all variants of the engine, that is for one-cylinder and two-cylinder engines, can be machined on the same work-station. Practically all gear shafts and their bearing sites can be tooled in one working step from one side, for instance with a multiple-spindle drilling station.

The balancer shaft 25, the crankshaft 6, the first gearbox shaft 9, the second gearbox shaft 11, the first secondary shaft 13 and the second secondary shaft 14 lie in one and the same plane, which is the first partitioning plane 34 between the first engine housing part 18, 118 and the second housing part 19, 119.

The second secondary shaft 14 is positioned in the area of a second partitioning plane 35 between the second housing part 19, 119 and the third housing part 20, 120, where the second partitioning plane 35 may be parallel to the first partitioning plane 34.

Due to the modularity of the design diesel and spark-ignited engines with one or two cylinders with a maximum number of shared components and only two different types of engine housing 17 or 117 (one or two cylinders) may be produced. The engine housings 17, 117 for one or two cylinders may be machined with the same set of tools, the tools for the second cylinder idling when a one-cylinder housing is being tooled.

By including and attaching components such as diverse secondary reduction steps in first auxiliary modules 27, a differential 30a of the fourth auxiliary module 30, a centrifugal clutch 32a of the sixth auxiliary module 32, a PTO-shaft 28a of the second auxiliary module 28, an output gear step 31a of the fifth auxiliary module 31, the engine variant considered (spark-ignited or diesel, single or double cylinder) may be adapted to the requirements of a specific vehicle type.

The secondary reduction gear steps of the first auxiliary module 27 permit the engine to be used for diverse types of vehicle, the simple gear step 27a being used if the gearbox 10 and the gearbox output train 12 are positioned behind the engine, while a reverse gear step 27 with chain transmission permits the gearbox 10 and the gearbox output train 12 to be placed in front of the engine (engine behind the axle). The shiftable reduction gear step 27c or the shiftable crawler reduction gear step 27d present the possibility of using the internal combustion engine 1 for all terrain vehicles (ATVs) or small capacity tractors (SMCTs).

Following is a list of the shared components that are possible:
- shared crankcase for single-cylinder diesel or spark-ignited engines,
- shared crankcase for two-cylinder diesel or spark-ignited engines,
- assembled crankshaft 6 for all variants with differing tooling,
- shared cylinder head 22 for one- and two-cylinder spark-ignited engines (single cylinder heads),
- shared cylinder head 22 for one- and two-cylinder diesel engines (single cylinder heads),
- identical position of camshaft and valve drive for all variants of the engine,
- identical axis distance for all variants of secondary reduction gears,
- identical housing cover 21 and/or 21a for all variants of secondary reduction gears,
- shared variable-speed gear box 10 for all variants of the engine.

Following are tables with examples of the combinatory possibilities presented by an engine according to the invention for use in different vehicle types.

TABLE 1

| Motor-rickshaw | Diesel | | Spark-ignited | |
|---|---|---|---|---|
| Number of cylinders | 1 | 2 | 1 | 2 |
| Simple gear 27a | X | X | — | — |
| Reverse gear 27b | ○ | ○ | — | — |
| Reduction gear 27c | — | — | — | — |
| Crawler reduction gear step 27d | — | — | — | — |
| PTO shaft 28a | — | — | — | — |
| Differential 30a | ○ | ○ | — | — |
| Four-wheel-drive 31a | — | — | — | — |
| Centrifugal clutch 32a | — | — | — | — |

X . . . standard
○ . . . optional

TABLE 2

| ATV (all terrain vehicle) | Diesel | | Spark-ignited | |
|---|---|---|---|---|
| Number of cylinders | 1 | 2 | 1 | 2 |
| Simple gear step 27a | — | — | — | — |
| Reverse gear step 27b | — | — | — | — |
| Reduction gear step 27c | — | X | X | X |
| Crawler reduction gear step 27d | — | — | — | — |
| PTO shaft 28a | — | ○ | — | ○ |
| Differential 30a | — | X | X | X |
| Four-wheel-drive 31a | — | X | X | X |
| Centrifugal clutch 32a | — | X | X | X |

X . . . standard
○ . . . optional

TABLE 3

| Small capacity tractor (SMCT) | Diesel | | Spark-ignited | |
|---|---|---|---|---|
| Number of cylinders | 1 | 2 | 1 | 2 |
| Simple gear step 27a | — | — | — | — |
| Reverse gear step 27b | — | — | — | — |
| Reduction gear step 27c | — | — | — | — |

TABLE 3-continued

| Small capacity tractor (SMCT) | Diesel | | Spark-ignited | |
|---|---|---|---|---|
| Number of cylinders | 1 | 2 | 1 | 2 |
| Crawler reduction gear step 27d | ○ | X | — | — |
| PTO shaft 28a | X | X | — | — |
| Differential 30a | ○ | X | — | — |
| Four-wheel-drive 31a | ○ | X | — | — |
| Centrifugal clutch 32a | — | — | — | — |

X . . . standard
○ . . . optional

TABLE 4

| Micro Car | Diesel | | Spark-ignited | |
|---|---|---|---|---|
| Number of cylinders | 1 | 2 | 1 | 2 |
| Simple gear step 27a | ○ | ○ | — | — |
| Reverse gear step 27b | X | X | — | — |
| Reduction gear step 27c | — | — | — | — |
| Crawler reduction gear step 27d | — | — | — | — |
| PTO shaft 28a | — | — | — | — |
| Differential 30a | X | X | — | — |
| Four-wheel-drive 31a | — | — | — | — |
| Centrifugal clutch 32a | X | X | — | — |

X . . . standard
○ . . . optional

The invention claimed is:

1. Modular internal combustion engine comprising an engine housing with a crankshaft drive having at least one reciprocating piston in a cylinder, which acts on a crankshaft by means of a connecting rod, and a variable-speed gear box connected to the crankshaft via a disengaging clutch, and a gearbox output train which connects to at least one drive shaft of a vehicle, wherein the internal combustion engine is provided with least one main module including the subassemblies engine housing, crankshaft drive, variable-speed gearbox, and gearbox output train, and at least one auxiliary module attachable to the main module, and wherein no mechanical connection between the variable-speed gearbox and the gearbox output train is provided within the main module but a rotational connection is facilitated by attaching a first auxiliary module to the main module, wherein the variable-speed gearbox includes an output shaft and the gearbox output train includes a secondary input shaft, wherein the first auxiliary module includes a gear step between the output shaft and the secondary input shaft, and wherein an axis distance of the gear step corresponds to an axis distance between the output shaft and the secondary input shaft.

2. Internal combustion engine according to claim 1, wherein the main module includes the crankshaft.

3. Internal combustion engine according to claim 1, wherein the first auxiliary module has the same housing wall in all gear variants.

4. Internal combustion engine according to claim 1, wherein a second auxiliary module with an output gear for a power take-off shaft can be attached to a gear shaft of the variable-speed gearbox.

5. Internal combustion engine according to claim 1, wherein a third auxiliary module with a shiftable reverse gear for the variable-speed gearbox can be attached to the main module.

6. Internal combustion engine according to claim 1, wherein a fourth auxiliary module with a differential gear for the gearbox output train can be attached to the main module.

7. Internal combustion engine according to claim 6, wherein a fifth auxiliary module with an output driving gear for the gearbox output train can be attached to the main module or the fourth auxiliary module.

8. Internal combustion engine according to claim 1, wherein a sixth auxiliary module with a centrifugal clutch can be attached to the main module at the input side of the variable-speed gearbox.

9. Internal combustion engine according to claim 1, wherein the main module includes an engine housing configured for one cylinder or an engine housing for two cylinders.

10. Internal combustion engine according to claim 1, wherein at least five shafts are positioned in one and the same plane.

11. Internal combustion engine according to claim 10, wherein at least crank shaft, balancer shaft, first gearbox shaft, second gearbox shaft and first secondary shaft are positioned in one and the same plane.

12. Internal combustion engine according to claim 10, wherein the plane is a first partitioning plane between two housing parts.

13. Internal combustion engine according to claim 1, wherein the main module can be used for at least two types of vehicles from the group of motor-rickshaws, ATVs, small tractors and micro-cars.

14. Modular internal combustion engine comprising an engine housing with a crankshaft drive having at least one reciprocating piston in a cylinder, which acts on a crankshaft by means of a connecting rod, and a variable-speed gear box connected to the crankshaft via a disengaging clutch, and a gearbox output train which connects to at least one drive shaft of a vehicle, wherein the internal combustion engine is provided with least one main module including the subassemblies engine housing, crankshaft drive, variable-speed gearbox, and gearbox output train, and at least one auxiliary module attachable to the main module, and wherein no mechanical connection between the variable-speed gearbox and the gearbox output train is provided within the main module but a rotational connection is facilitated by attaching a first auxiliary module to the main module, wherein at least five shafts are positioned in one and the same plane.

15. Internal combustion engine according to claim 14, wherein the main module includes the crankshaft.

16. Internal combustion engine according to claim 14, wherein the first auxiliary module contains at least one gear step.

17. Internal combustion engine according to claim 14, wherein the axis distance of the gear step corresponds to the axis distance between an output shaft of the variable-speed gearbox and a secondary input shaft of the gearbox output train.

18. Internal combustion engine according to claim 14, wherein the first auxiliary module has the same housing wall in all gear variants.

19. Internal combustion engine according to claim 14, wherein a second auxiliary module with an output gear for a power take-off shaft is attached to a gear shaft of the variable-speed gearbox.

20. Internal combustion engine according to claim 14, wherein a third auxiliary module with a shiftable reverse gear for the variable-speed gearbox is attached to the main module.

21. Internal combustion engine according to claim 14, wherein a fourth auxiliary module with a differential gear for the gearbox output train is attached to the main module.

22. Internal combustion engine according to claim 21, wherein a fifth auxiliary module with an output driving gear for the gearbox output train is attached to the main module or the fourth auxiliary module.

23. Internal combustion engine according to claim 14, wherein a sixth auxiliary module with a centrifugal clutch is attached to the main module at the input side of the variable-speed gearbox.

24. Internal combustion engine according to claim 14, wherein the main module includes an engine housing configured for one cylinder or an engine housing for two cylinders.

25. Internal combustion engine according to claim 14, wherein at least crank shaft, balancer shaft, first gearbox shaft, second gearbox shaft and first secondary shaft are positioned in one and the same plane.

26. Internal combustion engine according to claim 14, wherein the plane is a first partitioning plane between two housing parts.

27. Internal combustion engine according to claim 14, wherein the main module can be used for at least two types of vehicles from the group of motor-rickshaws, ATVs, small tractors and micro-cars.

* * * * *